United States Patent [19]

Saumweber et al.

[11] 4,430,703

[45] Feb. 7, 1984

[54] ANTI-LOCK DEVICE FOR VEHICLE BRAKES

[75] Inventors: Eckart Saumweber, Gauting; Klaus Schirmer, Mindelstetten, both of Fed. Rep. of Germany

[73] Assignee: Knorr-Bremse GmbH, Fed. Rep. of Germany

[21] Appl. No.: 301,398

[22] Filed: Sep. 11, 1981

[30] Foreign Application Priority Data

Sep. 11, 1980 [DE] Fed. Rep. of Germany ....... 3034227

[51] Int. Cl.³ ............................................... B60T 8/08
[52] U.S. Cl. ....................................... 364/426; 303/93
[58] Field of Search ...................... 364/426; 303/93–97

[56] References Cited

U.S. PATENT DOCUMENTS 3,998,496 12/1976 Bernabo et al. ................ 364/426 X
4,046,213 9/1977 Larson ........................... 364/426 X
4,072,206 2/1978 Larson et al. .................. 364/426 X Primary Examiner—J. V. Truhe
Assistant Examiner—Saul M. Bergmann
Attorney, Agent, or Firm—Edmund M. Jaskiewicz

[57] ABSTRACT

An anti-lock device for vehicle brakes has a wheel generator which emits pulse-type signals whose frequency is proportional to the rotary speed of the wheel. A counter counts the pulses emitted during each of successive time intervals and these pulses are connected to a first memory which stores the count of the immediate preceding time interval and to a second memory which stores the count of the time interval next preceding the intermediate time interval. A logic circuit then produces a wheel speed value which is based on the wheel speed counts of the immediate preceding and next preceding time intervals.

6 Claims, 4 Drawing Figures

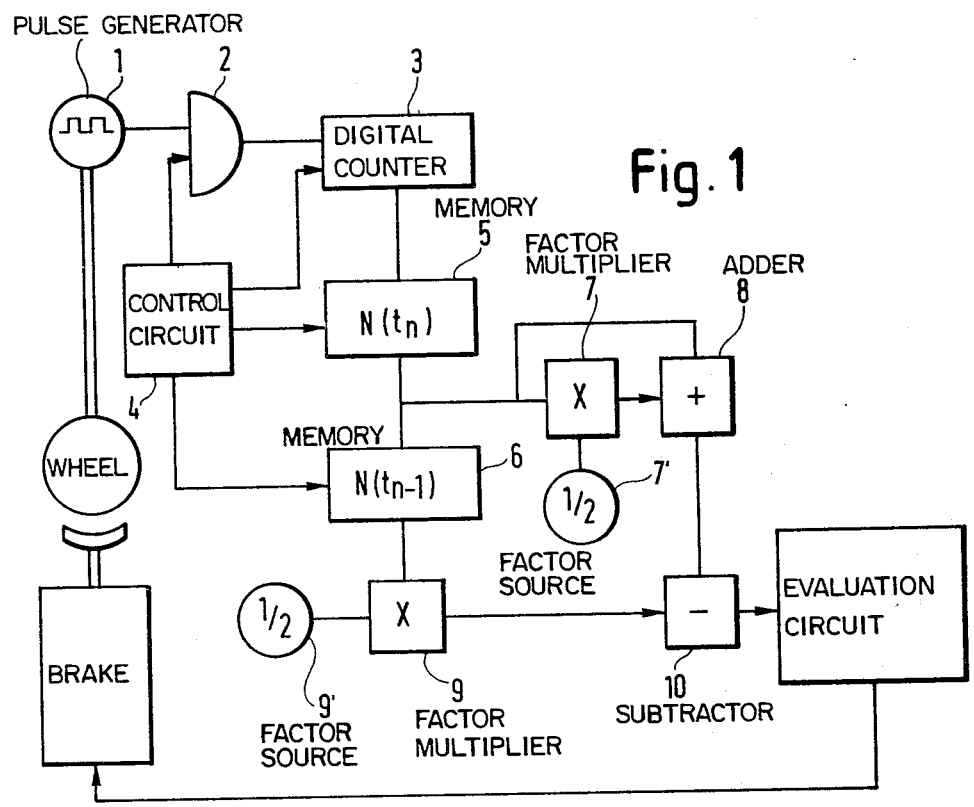
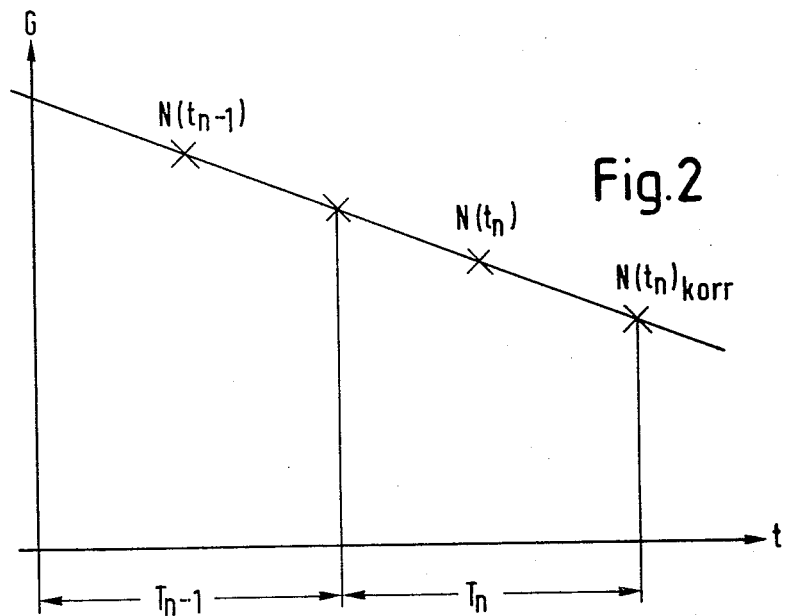

ANTI-LOCK DEVICE FOR VEHICLE BRAKES

The present invention relates to an anti-lock device for vehicle brakes in which a wheel generator produces signal pulses whose frequency is proportional to the wheel speed, more particularly, to such a device which produces a wheel speed signal which more closely corresponds to the actual wheel speed at the end of a measurement time interval.

It has been known to protect vehicle brake systems against locking or slipping with a device which senses the rotary speed of at least one wheel and utilizes an evaluation circuit which controls the actuation of the vehicle brakes in response to the sensed wheel speed signals. The wheel speed is generally sensed by a generator coupled to the wheel and the frequency of the output signals of the generator is proportional to the wheel speed. There are generally further provided a digital counter connected to the generator and a control circuit connected to the control input of the counter which alternately, during predetermined measurement intervals, sets the counter in readiness to count, resets the counter and/or stops the counter at the end of a time interval. A memory is provided to which is introduced the count of the counter at those times predetermined by the control circuit.

Such a device for a vehicle brake system is known in general and usually uses a pulse generator with rectangular output signals. If a generator is used with sine-output signals, a pulse shaper stage (sine/rectangular converter) is also connected with the generator so as to produce rectangular signals. A significant disadvantage of such vehicle brake systems is that the value obtained at the end of a measurement time interval is only correct when the wheel speed of the wheel has not changed and has remained constant during the time interval of measurement. In those situations where the wheel speed varies during the time interval the measured value obtained represents only an average of the wheel speed during the measurement interval.

It is preferred and it is most advantageous if the vehicle brake system could be protected against locking with respect to the actual wheel speed of the vehicle and not some value of wheel speed which is lagging behind the actual wheel speed, particularly when there are relatively rapid variations in wheel speed such as would occur during a control cycle involving either acceleration or deceleration of the vehicle.

It is therefore the principal object of the present invention to provide a novel and improved anti-lock device for vehicle brakes of the type as generally disclosed herein.

It is another object of the present invention to provide such an anti-lock device for vehicle brakes wherein the measured value of the wheel speed more closely corresponds to the actual wheel speed occurring at the end of a measurement time interval.

It is a further object of the present invention to provide a device for preventing locking in a vehicle brake system wherein the wheel speed value used for actuating the device is based upon the wheel speed counts for two successive time intervals.

According to one aspect of the present invention there is provided an anti-lock device for vehicle brakes wherein means connected to a vehicle wheel generates an output signal indicative of the wheel speed. This output signal is transmitted to a digital counter which is also connected to a control circuit for setting the counter to count during a predetermined time interval, locking the counter after the time interval and resetting the counter for a further time interval. A first memory connected to the counter stores the count from the counter of the immediate preceding time interval and a second memory connected to the control circuit and to either the counter or first memory stores the count of the counter of the next preceding time interval. An evaluating circuit connected to both first and second memories then produces a wheel speed value based upon the two stored wheel speed counts of the immediate preceding and next preceding time intervals.

The anti-lock device for the vehicle brakes thus is actuated by corrected wheel speed value obtained by extrapolation of the measured wheel speed values of the immediate and next preceding time intervals. This extrapolation may be linear or quadratic.

Other objects and advantages of the present invention will be apparent upon reference to the accompanying description when taken in conjunction with the following drawings, which are exemplary, wherein;

FIG. 1 is a block circuit diagram of the anti-lock device of the present invention;

FIG. 2 is a graph showing changes of wheel speed with respect to measurement time intervals in accordance with the anti-lock device of the present invention;

Proceeding next to the drawings wherein like reference symbols indicate the same parts throughout the various views a specific embodiment and modifications of the present invention will be described in detail.

Figure 3:
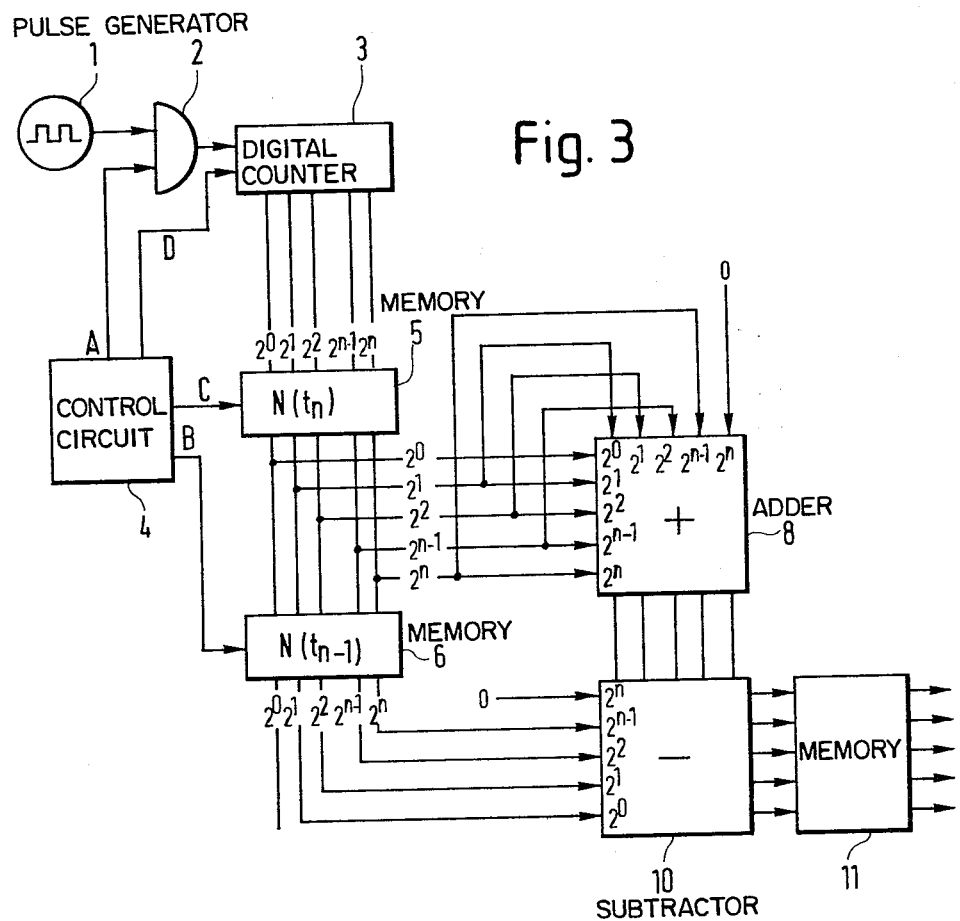
FIG. 3 is a block diagram of a modification of FIG. 1 and showing wiring connections between the several components of the anti-lock device.

As may be seen in FIG. 1, a pulse generator 1 which is coupled to a wheel of the vehicle so as to be driven thereby produces a pulse-form output signal the frequency of which is proportional to the rotary speed of the wheel. The pulse generator could be connected together with a pulse shaper stage, if necessary, in order to produce a rectangular signal.

The output of the pulse generator 1 is connected to one input of a gate circuit 2 which is preferably an AND gate the output of which is supplied to the counter input of a digital counter 3. A control circuit 4 is connected to a second input of the gate circuit 2 and also to a control input of the counter 3. The output of the counter 3 is connected to an input of a first memory 5. The output of the memory 5 is connected to the input of a second memory 6.

The outputs of memory 5 are also connected to an input of a factor multiplier 7 and to the input of an adder 8. The other input of the factor multiplier 7 is connected to a factor source 7' while the output of the factor multiplier 7 is connected to the other input of the adder 8.

The outputs of the second memory 6 are connected to an input of a further factor multiplier 9 which has a second input connected to a further factor source 9'.

The output of the adder 8 is connected to one input of a subtractor 10. Another input of the subtractor 10 is connected to the output of the factor multiplier 9.

The output of the subtractor 10 is a value corresponding to the rotary speed of the wheel at the end of the last or immediate preceding time measurement interval. This wheel speed value is a corrected value of the wheel speed of the immediate preceding time interval. Reference to FIG. 2 will illustrate that the value of the wheel speed for the immediate preceding time measurement interval $T_n$ is $N(T_n)$ which is the average of the wheel speed during the time interval, assuming a linear variation in speed. The wheel speed value of the next immediate preceding time interval $T_{n-1}$ is shown as $N(t_{n-1})$. The value of the output of the subtractor 10 is $1.5 \times N(t_n) - 0.5 \times N(t_{n-1})$. And this value corresponds with the value of the wheel speed at the end of the last or immediate preceding time interval $T_n$. Again, as illustrated in FIG. 2, this corrected value is based upon the assumption of a linear change of wheel speed as illustrated in FIG. 2.

This corrected wheel speed value is then introduced into an evaluation circuit which detects from the wheel speed signals any locking or slipping of the wheel. The correct signals are then supplied from an evaluation circuit to the brakes to overcome any locking of the wheel as measured by the circuit shown in FIG. 1.

The circuit in FIG. 3 corresponds basically to the circuit of FIG. 1 and the components in FIG. 3 corresponding to components FIG. 1 have the same reference symbols. However, in FIG. 3, the factor multipliers have been replaced by fixed wire connections between the memories 5 or 6 and the adder 8 or the subtractor 10.

If the outputs of the memories 5 and 6 are binary coded, a multiplication by the factor 0.5 is simply obtained by shifting the individual binary position one place to the right, i.e., in the direction of smaller values. This thus means that the inputs of the adder 8 are respectively connected in the correct allocations to the outputs of the memory 5. For example, the bit position of the memory 5 with the value $2^0$ is connected to the corresponding bit position $2^0$ of the adder 8. However, the other inputs of the adder 8 are connected to the output of the memory 5 such that the output with the value $2^n$ of the memory is connected to the input with the value $2^{n-1}$ of the adder. The connections are continued in this manner until the output with the value $2^1$ is connected to the input with the value $2^0$. The input of the adder with the value $2^n$ hence leads to the value 0.

In a similar manner, the outputs of the memory 6 are connected, shifted by one bit position, to the inputs of the subtractor 10. In addition, it can also be provided that the outputs of the subtractor 10 are connected to inputs of a further memory 11.

Figure 4:
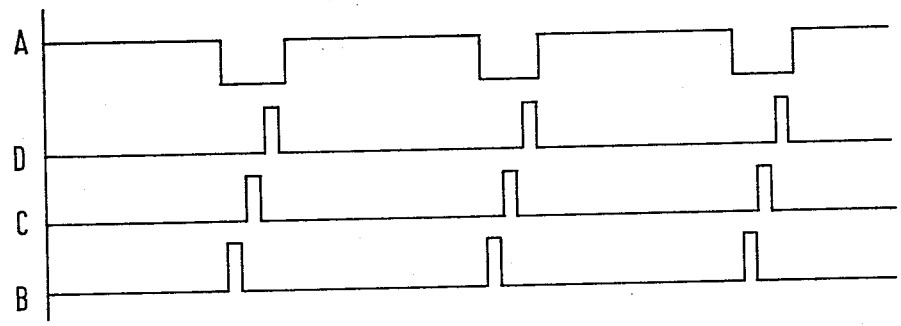
FIG. 4 is a chart showing a single control pulse with respect to time.

The time sequence of the individual control pulses is illustrated in FIG. 4. The control pulses A represent the gate pulses while the gate circuit 2 passes the pulses from the pulse generator 1. At the end of each individual pulse A there appears a short pulse B which controls the memory 6 such that the memory 6 accepts the memory content of the memory 5. After the disappearance of the respective pulses N, there also appears a short pulse C which controls the memory 5 such that it accepts the count value of the counter 3. After disappearance of the respective pulse C, there then appears a reset pulse D which resets the counter 3 to 0. Upon this resetting step, the next gate control pulse A appears and a new measurement cycle commences.

It is therefore apparent that the circuit as described herein will always supply the exact value of the RPM or wheel speed at the end of the respective last or immediately preceding measurement interval both with increasing and decreasing wheel speeds when the wheel speed varies linearly during a time measurement interval.

It is to be understood that instead of a linear extrapolation as disclosed and described above, a quadratic or cubic extrapolation can also be used. It is also possible to use an exponential or hyperbolic extrapolation when it is reasonably expected that the wheel speeds will vary according to such a function and when a much higher degree of measurement accuracy is desired. The logic circuit of components 7–10 must then be constructed such that this circuit determines the corresponding function from the two counter values.

The accuracy of wheel speed measurement can be even further increased by providing a third memory which is connected after the memory 6 and which then contains the count value of the counter of the second next immediate preceding time interval $(T_{n-2})$.

Thus it can be seen that the present invention has provided an improved anti-lock device for vehicle brakes wherein the wheel speed value is based upon the actual wheel speed at the end of a time measurement interval. This value is based upon a linear variation of speed during time measurement intervals, but can also be based on the variation of the wheel speed based upon other functions such as hyperbolic or quadratic. The signals thus transmitted by the evaluating circuit are based upon wheel speed of the immediately preceding time measurement interval and not upon a lagging wheel speed value, such as, for example, the average wheel speed of a time measurement interval.

It will be understood that this invention is succeptible to modification in order to adapt it to different usages and conditions, and accordingly, it is designed to comprehend such modifications within this invention as they fall within the scope of the apended claims.

What is claimed is:

1. In an anti-lock device for vehicle brakes, the combination of means connected to a wheel of a vehicle for generating an output signal indicative of the wheel speed, a digital counter having a counter input connected to the output of said signal generating means, control circuit means connected to a control input of said counter for setting the counter to count during a predetermined time interval and locking the counter after the time interval and resetting the counter for a further time interval, a first memory connected to an output of said counter and to said control circuit means to store the count of the counter at times set by said control circuit means, a second memory connected to said control circuit means and to one of said counter and said first memory to store the count of the counter of the next preceding time interval while said first memory stores the count of the immediate preceding time interval, and evaluating circuit means connected to both said first and second memories for producing a wheel speed value based on the two stored wheel speed counts of the immediate preceding and next preceding time intervals.

2. In an anti-lock device as claimed in claim 1 wherein said evaluating circuit means performs a linear extrapolation between said wheel speed counts.

3. In an anti-lock device as claimed in claim 1 wherein said evaluating circuit means comprises a first factor multiplier connected to the output of said first memory, an adder having a first input connected to the output of said first memory and a second input connected to an output of said first multiplier, a second factor multiplier connected to the output of said second memory, a subtractor having a first input connected to an output of said adder and a second input connected to an output of said second factor multiplier, said subtractor producing said wheel speed value.

4. In an anti-lock device as claimed in claim 3 wherein said first and said second factor multipliers each multiply their input values by the factor 0.5.

5. In an anti-lock device as claimed in claim 4 wherein said factor multipliers comprise fixed wire connections displaced by one bit position between the components being connected.

6. In an anti-lock device as claimed in claim 1 and further comprising a third memory connected to an input of said evaluating circuit.

* * * * *